(12) United States Patent
Zhang (10) Patent No.: US 9,042,396 B2
(45) Date of Patent: May 26, 2015

(54) SYSTEM AND METHOD FOR PROCESSING MULTIMEDIA MESSAGING SERVICE

(75) Inventor: Hengsheng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 783 days.

(21) Appl. No.: 13/257,888

(22) PCT Filed: Apr. 21, 2010

(86) PCT No.: PCT/CN2010/071988
§ 371 (c)(1),
(2), (4) Date: Dec. 29, 2011

(87) PCT Pub. No.: WO2011/006383
PCT Pub. Date: Jan. 2, 2011

(65) Prior Publication Data
US 2012/0115516 A1 May 10, 2012

(30) Foreign Application Priority Data
Jul. 13, 2009 (CN) .......................... 2009 1 0140353

(51) Int. Cl.
*H04W 4/12* (2009.01)
*H04L 29/06* (2006.01)
*H04W 88/18* (2009.01)

(52) U.S. Cl.
CPC .......... *H04W 4/12* (2013.01); *G06F 2213/0038* (2013.01); *H04W 88/184* (2013.01); *H04L 65/605* (2013.01); *H04L 65/80* (2013.01); *H04L 65/103* (2013.01)

(58) Field of Classification Search
CPC ..... H04L 65/103; H04L 65/605; H04L 65/80; H04W 88/184
USPC ........................................... 709/231; 713/150
See application file for complete search history.

(56) References Cited

U.S. PATENT DOCUMENTS 7,398,348 B2    7/2008  Moore et al.
2006/0161676 A1* 7/2006  Hong et al. ................... 709/231
(Continued)

FOREIGN PATENT DOCUMENTS

CA    2693823 A1    1/2009
CN    1564138 A     1/2005
(Continued)

OTHER PUBLICATIONS

International Search Report in international application No. PCT/CN2010/071988, mailed on Jul. 22, 2010.
(Continued)

*Primary Examiner* — Mark Rinehart
*Assistant Examiner* — Gbemileke Onamuti
(74) *Attorney, Agent, or Firm* — Oppedahl Patent Law Firm LLC (57) ABSTRACT

The disclosure disclosed a system and method for processing a Multimedia Messaging Service (MMS). The system comprises: a first and second storage units for storing MMS data, a first control unit for controlling the storage of received MMS data outside the system into the first storage unit and data acquisition from the first storage unit, and a second control unit for controlling the writing of the MMS data stored in the first storage unit into the second storage unit according to performance of the second storage unit. The disclosure improves the processing performance of a Multimedia Messaging Service Center (MMSC) system, lowers the construction cost of an MMS server of the MMSC system, and guarantees the stable running of the MMSC system.

13 Claims, 6 Drawing Sheets

(56) References Cited

U.S. PATENT DOCUMENTS

2009/0157973 A1   6/2009  Li et al.
2009/0222655 A1*  9/2009  Martinent et al. ............ 713/150

FOREIGN PATENT DOCUMENTS

| CN | 101135994 A | 3/2008 |
|---|---|---|
| CN | 101350942 A | 1/2009 |
| CN | 101610477 A | 12/2009 |
| RU | 2236092 C1 | 9/2004 |
| RU | 2284570 C2 | 9/2006 |
| RU | 2288545 C2 | 11/2006 |
| RU | 2301499 C1 | 6/2007 |
| RU | 2007126909 A | 1/2009 |
| RU | 2357380 C1 | 5/2009 |
| WO | 2007/088203 A2 | 8/2007 |

OTHER PUBLICATIONS

English Translation of the Written Opinion of the International Search Authority in international application No. PCT/CN2010/071988, mailed on Jul. 22, 2010.

* cited by examiner

SYSTEM AND METHOD FOR PROCESSING MULTIMEDIA MESSAGING SERVICE

TECHNICAL FIELD

The disclosure relates to the field of communications, particularly to a system and method for processing a Multimedia Messaging Service (MMS).

BACKGROUND

An MMS is a brand-new messaging service capable of transmitting multimedia contents between mobile phones or between a mobile phone and an E-mail server or other terminals. Compared with a short message service in a text form, the MMS is advantaged in its capability of providing a user with multimedia messages such as image and voice.

In related technologies, the maximum size of contents of one short message is 140 bytes, the storage and management of the messages can be typically realized by a commercial database, and based on IO performance of an existing disc array, thousands of short messages can be processed every second. The size of one multimedia message is generally about 100 Kbytes, and existing protocol standards for a multimedia messaging service have made no limitation to the size of a multimedia message, thus, the size of the contents of a multimedia message may become larger and larger with the improvement in the capability of a terminal. Being a non-real-time service, an MMS is typically processed in the following way: a submitted multimedia message is received by a receiving service and processing unit of an MMS Center (MMSC) and stored in an MMS storage server, and then forwarded to a receiving terminal.

Figure 1:
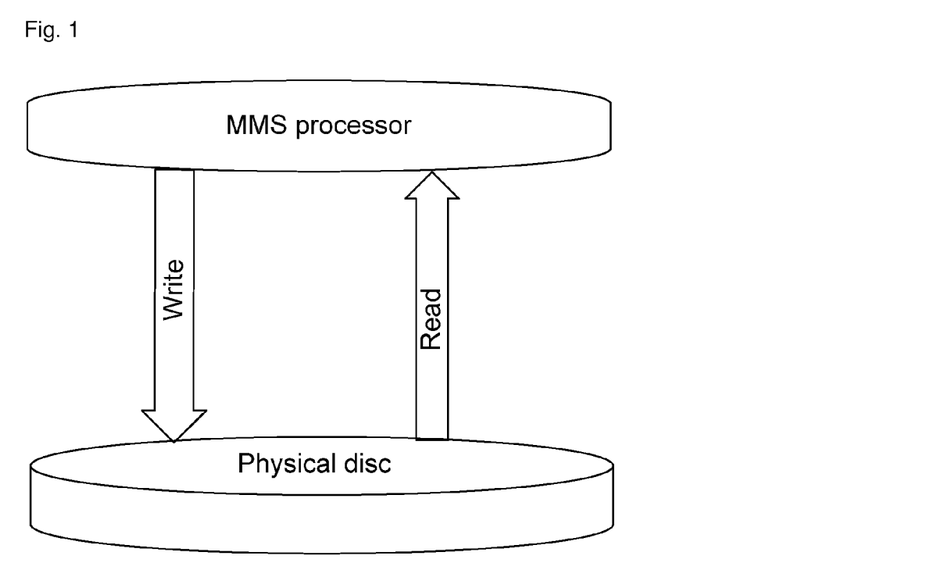
FIG. 1 is a schematic diagram illustrating the MMS message reading and writing of an MMS processor in related technologies.

FIG. 1 is a schematic diagram illustrating the MMS message reading and writing of an MMS processor in related technologies, as shown in FIG. 1, an MMS processor processes a received MMS message and directly writes the processed MMS message into a physical disc via a write interface and reads the MMS message via a read interface. Specifically, an MMSC may realize an MMS server with a Network Addition Storage (NAS) device and a Storage Area Network (SAN) device. The MMS server carries out a message sent from a receiving and processing unit and stores a multimedia message (e.g. a multimedia messaging service) in its storage unit in the form of a file, stores the index of the multimedia message in a database as user data and completes the reading, the writing and the deletion of the multimedia message.

However, no matter how an MMS storage server is realized, its IO performance is always limited for the following two reasons: the limitation in the performance of a disc: the maximum rotation speed of a disc is 15000 rpm at present, leading to a physical limitation to the IO performance of the MMS storage server; and the economic factor: the use of a storage server of a high IO performance means an increase in cost.

Many unpredictable consequences will be caused if the processing performance of the MMSC exceeds the limit of the IO performance of a storage server during a multimedia message processing. In order to make an MMSC system run stably, it is necessary to conduct a traffic control on the messages entering the MMSC, which will lead undoubtedly to degradation in the performance of the system. However, if an advanced storage device is used to improve the IO performance of a storage server, the cost will be increased.

Figure 2:
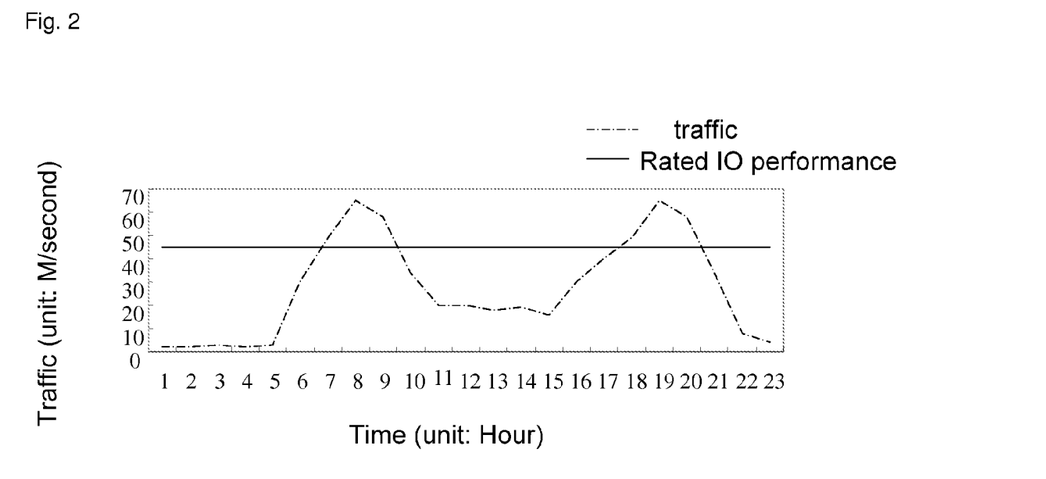
FIG. 2 is a schematic diagram illustrating the variation of the traffic of an MMSC with time in related technologies.

For instance, the mobile newspaper service that has been currently provided by China Mobile has changed the circulation manner of conventional newspaper by directly sending contents of a piece of newspaper to the mobile phone of a user in a multimedia message form, this new newspaper circulation method is convenient and efficient and saves labor cost, however, as shown in FIG. 2 which is a schematic diagram illustrating the variation of the traffic of an MMSC with time in related technologies, the sending of multimedia messages (mobile morning paper and mobile evening paper) in a concentrated period (e.g. 8:00 AM or 19:00 PM) causes an MMS processing system a traffic impact, which is typically of pulse type.

If the pulse-type traffic impact exceeds the IO performance of the MMS storage server, messages in the MMSC system will be jammed or a downtime will be caused, and the degradation in the processing performance of the MMSC will further lead to an influence on the sending of MMS messages. For instance, it can be appreciated from FIG. 1 that the processing on a mobile newspaper is limited in time, the concentrated sending of a mobile morning paper and a mobile evening paper will degrade the processing performance of the MMSC, and this degradation will further disable the timely transmission of the mobile newspaper to the user terminal and consequently lower the customer satisfaction.

SUMMARY

The disclosure is disclosed to provide a scheme for processing an MMS to solve the above problem, due to the limitation in the IO performance of an MMS storage system, the performance of an MMSC is degraded when the MMSC suffers a pulse-type impact.

In order to realize the above purpose, according to an aspect of the disclosure, a system for processing an MMS is provided.

According to the disclosure, a system for processing an MMS comprises: a first and second storage units for storing MMS data; a first control unit for controlling the storage of received MMS data outside the system into the first storage unit and data acquisition from the first storage unit; and a second control unit for controlling the writing of the MMS data stored in the first storage unit into the second storage unit according to performance of the second storage unit.

Further, the second control unit may comprise: a timer for synchronizing the MMS data in the first storage unit to the second storage unit at a fixed time; a traffic controller for calculating traffic of data written into the second storage unit from the first storage unit within each timing period of the timer; a comparator for comparing the traffic calculated by the traffic controller with a predefined threshold, wherein the predefined threshold is set according to the performance of the second storage unit; and a controller for determining whether to write the MMS data stored in the first storage unit into the second storage unit according to the result compared by the comparator.

Further, the controller may be further used for writing the MMS data stored in the first storage unit into the second storage unit if the traffic is less than the predefined threshold, and closing the timer and stopping the writing operation if the traffic is greater than or equal to the predefined threshold.

Further, the performance may comprise reading-writing performance of the second storage unit.

Further, the system may further comprise: a receiving unit for receiving MMS data outside the system; and a sending unit for reading the MMS data from the first storage unit and sending the MMS data to the outside of the system.

Further, the first storage unit may comprise a memory, and the second storage unit may comprise a physical disc.

In order to achieve the above purpose, according to another aspect of the disclosure, a method for processing an MMS is provided.

According to the disclosure, a method for processing an MMS comprises: receiving MMS data outside a system; storing the MMS data in a first storage unit;

and writing the MMS data stored in the first storage unit into a second storage unit according to performance parameters of the second storage unit.

Further, the method may further comprise: reading the MMS data from the first storage unit and sending the MMS data to the outside of the system Further, the step of writing the MMS data stored in the first storage unit into a second storage unit according to performance parameters of the second storage unit may comprise: periodically calculating traffic of data written into the second storage unit from the first storage unit; comparing the calculated traffic with a predefined threshold, wherein the predefined threshold is set according to the performance of the second storage unit; writing the MMS data stored in the first storage unit into the second storage unit if the traffic is less than the predefined threshold; and closing a timer and stopping the writing operation if the traffic is greater than or equal to the predefined threshold.

Further, the performance parameters may comprise a reading-writing performance parameter of the second storage unit.

Further, the predefined threshold may be less than the maximum rated reading-writing performance of the second storage unit.

According to the aforementioned technical scheme of the disclosure, a system and method for processing an MMS are provided, which can solve the problem that a traffic impact is caused on an MMSC system during the sending of a great number of MMSs, for example, the traffic impact caused by the sending mode of a mobile newspaper service on the MMSC system, thereby improving the processing performance of the MMSC system, reducing the construction cost of an MMS server of the MMSC system, and guaranteeing the stable running of the MMSC system.

Additional features and advantages of the invention will be set forth in the following specification, and in part will be apparent from the specification, or may be learned by implementation of the invention. The object and other advantages of the invention can be realized by and obtained from the structures especially illustrated in the specification, claims and the drawings.

BRIEF DESCRIPTION OF THE DRAWINGS

The drawings illustrated herein are provided for a better understanding of the disclosure and form one part of this disclosure, and the exemplary embodiments of the disclosure and the description thereof are for explaining the invention but not limiting the invention. In the drawings.

DETAILED DESCRIPTION

In an embodiment of the disclosure, a scheme for processing an MMS is provided, in which a first and second storage units store MMS data; a first control unit controls the storage of received MMS data into the first storage unit, reads MMS data from the first storage unit, and sends MMS data; and a second control unit controls the writing of the MMS data stored in the first storage unit into the second storage unit according to the performance of the second storage unit.

It should be noted that the embodiments of the disclosure and the features thereof can be combined with each other if no conflict is caused. The invention is described below in detail by reference to the drawings in conjunction with exemplary embodiments.

According to an embodiment of the disclosure, a system for processing an MMS is provided.

Figure 3:
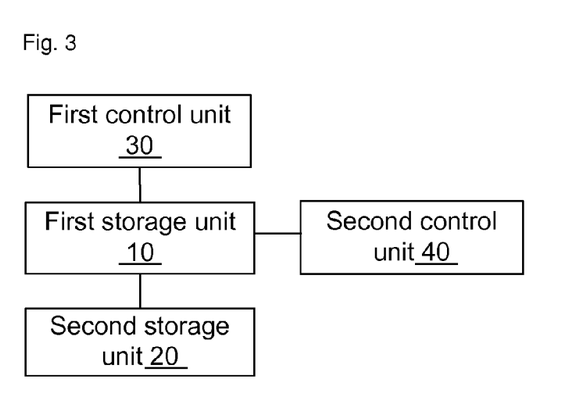
FIG. 3 is a block diagram illustrating a structure of a system for processing an MMS according to an embodiment of the disclosure.

FIG. 3 is a block diagram illustrating a structure of a system for processing an MMS according to an embodiment of the disclosure. According to this embodiment, as shown in FIG. 3, a system for processing an MMS comprises a first storage unit 10, a second storage unit 20, a first control unit 30 and a second control unit 40, each of which is described below in detail by reference to FIG. 3:

the first storage unit 10 is used for storing MMS data;

the second storage unit 20, coupled with the first storage unit 10, is used for storing MMS data;

the first control unit 30, coupled with the first storage unit 10, is used for controlling the storage of MMS data received from the outside of the system into the first storage unit 10 and MMS data acquisition from the first storage unit 10; and the second control unit 40, coupled with the first storage unit 10 and/or the first control unit 30 and preferably further coupled with the second storage unit 20, is used for controlling the writing of the MMS data stored in the first storage unit 10 into the second storage unit 20 according to the performance of the second storage unit 20.

Figure 4:
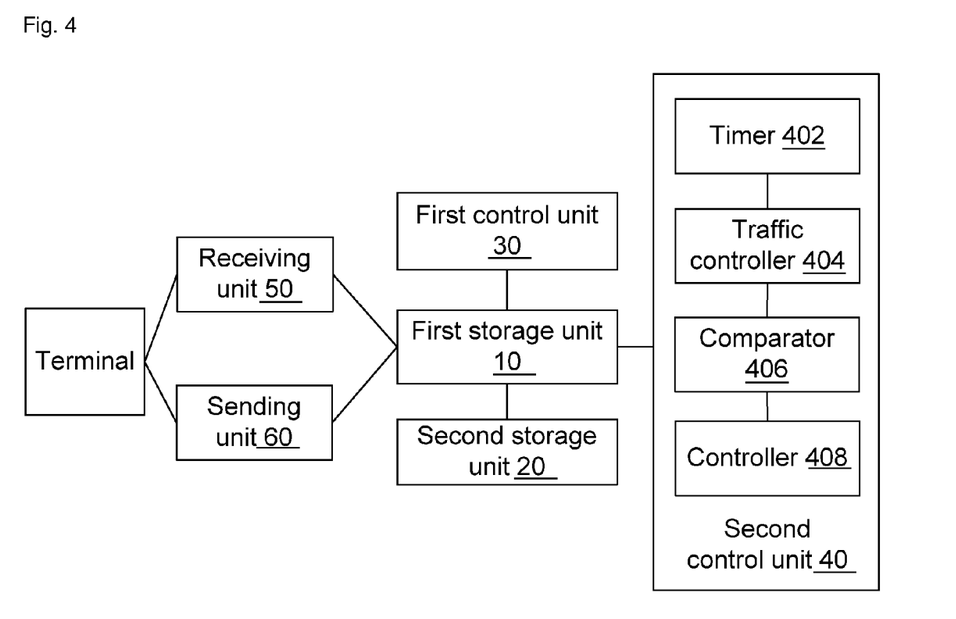
FIG. 4 is a block diagram illustrating a structure of a system for processing an MMS according to a preferred embodiment of the disclosure.

FIG. 4 is a block diagram illustrating a structure of a system for processing an MMS according to a preferred embodiment of the disclosure, as shown in FIG. 4, preferably, a system for processing an MMS further comprises a receiving unit 50 for receiving MMS data from a terminal or other network elements, and a sending unit 60 for reading MMS data from the first storage unit 10 and sending MMS data to other network elements.

The first control unit 30 further controls the receiving unit 50 to receive MMS data and processes MMS messages sent by a terminal, for example, processing an MMS message into MMS data and writing the MMS data into the first storage unit 10, and controls the sending unit 60 to send the stored MMS data to a terminal on a receiving side.

Preferably, the second control unit 40 in the system for processing an MMS further comprises a timer 402, a traffic controller 404, a comparator 406 and a controller 408.

The timer 402 is used for synchronizing the MMS data in the first storage unit 10 to the second storage unit 20 at a fixed time; the traffic controller 404, coupled with the timer 402, is used for calculating traffic of data written into the second storage unit 20 from the first storage unit 10 within each timing period of the timer 402; the comparator 406, coupled with the traffic controller 404, is used for comparing the traffic calculated by the traffic controller 404 with a predefined threshold, wherein the predefined threshold is set according to the performance of the second storage unit 20, and specifically, the predefined threshold may be set to be less than the maximum rated 10 reading-writing performance of the second storage unit 20; and the controller 408 is used for controlling the timer 402 and determining whether to write the MMS data stored in the first storage unit into the second storage unit according to the result compared by the comparator 406. For instance, the MMS data stored in the first storage unit are written into the second storage unit if the result compared by the comparator is that the traffic of the traffic controller 404 is less than the predefined threshold; and the timer is closed and the writing operation is stopped if the traffic of the traffic controller is greater than or equal to the predefined threshold.

In this embodiment, by using the second storage unit 20 as a buffer, MMS data are first stored in the first storage unit 10 and then written into the second storage unit 20 under the control of the second control unit 40, which solves the problem that in related technologies, due to the limitation in the IO throughout performance of an MMS storage system, the processing performance of an MMSC is degraded when the MMSC suffers a pulse-type impact, therefore, the stability and the processing performance of the system are improved.

Figure 5:
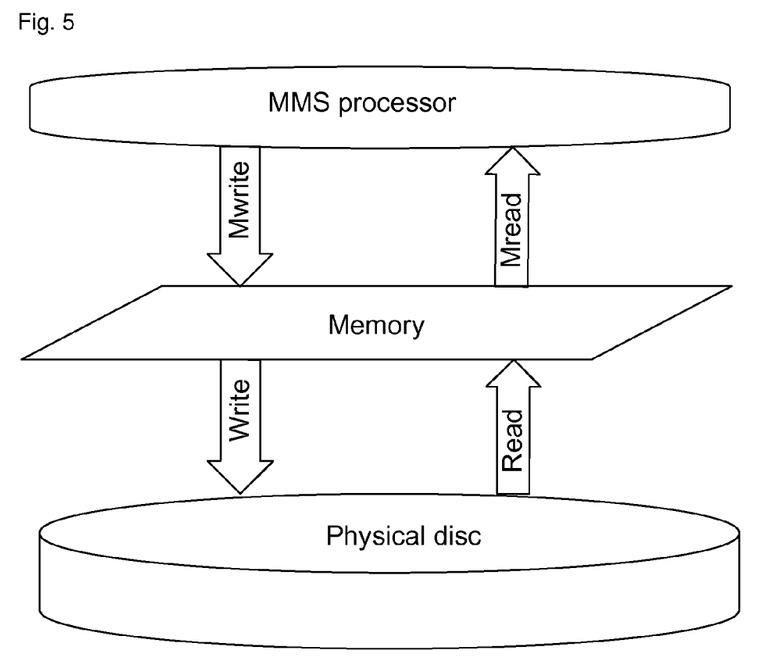
FIG. 5 is a schematic diagram illustrating the MMS message reading and writing of an MMS processor according to a preferred embodiment of the disclosure.

FIG. 5 is a schematic diagram illustrating the MMS message reading and writing of an MMS processor according to a preferred embodiment of the disclosure, as shown in FIG. 5, a system for processing an MMS may comprise an MMS processor (including a processing unit), a memory and a physical disc. Specifically, the memory may be a first storage unit 10, and the physical disc may be a second storage unit 20.

The aforementioned first control unit 30, second control unit 40, receiving unit 50 and sending unit 60 are included in the processing unit of the MMS processor. The first control unit 30 controls the receiving unit to receive an MMS message, processes the MMS message into MMS data and writes the MMS data into the memory, and controls the sending unit 60 to send the MMS data stored in the memory to a terminal on a receiving side; the second control unit 40 controls the memory to write MMS data into the physical disc according to the IO performance of the physical disc.

The memory (namely, the first storage unit 10) is used for receiving MMS data from the processing unit via a memory write (Mwrite) interface, storing the MMS data, and writing the MMS data stored in the memory into the processing unit via a memory read (Mread) interface according to the requirement of the processing unit; and the processing unit controls the writing of MMS data into the physical disc via a Write interface and the reading of MMS data from the physical disc via a Read interface.

The physical disc (namely, the second storage unit 20) is used for receiving MMS data from the memory, storing the received MMS data, and writing the stored MMS data into the memory according to the requirement of the memory.

Through this embodiment, a system for processing an MMS is provided, which comprises a first control unit, a second control unit, a first storage unit and a second storage unit, and it is capable of improving the processing performance of an MMSC, reducing the construction cost of an MMS server of the MMSC and guaranteeing the stable running of the MMSC.

According to an embodiment of the disclosure, a method for processing an MMS is provided.

Figure 6:
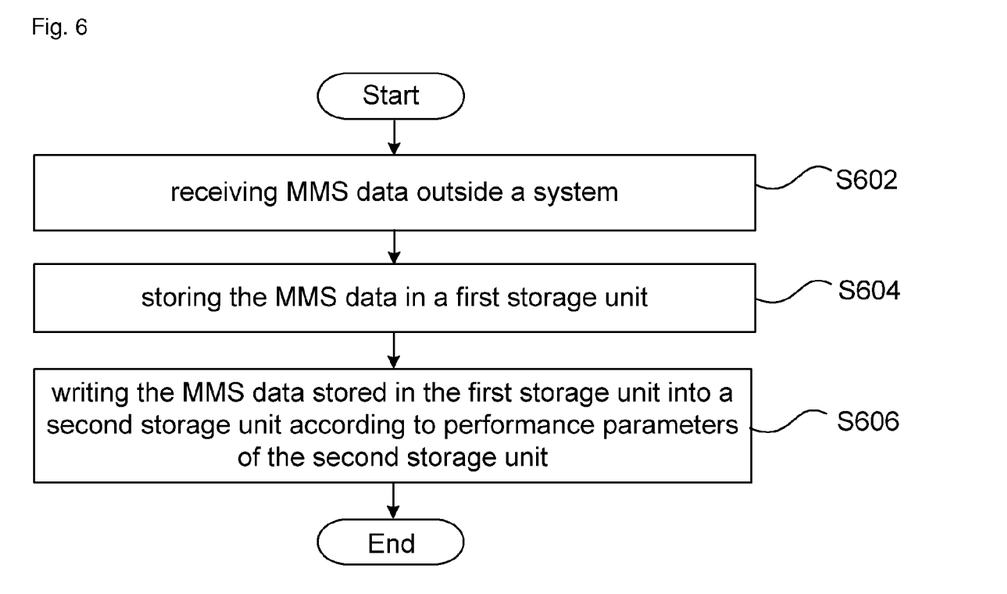
FIG. 6 is a flow diagram of a method for processing an MMS according to an embodiment of the disclosure.

FIG. 6 is a flow diagram of a method for processing an MMS according to an embodiment of the disclosure, the method comprises the following steps (steps S602-S606).

Step S602: receiving MMS data outside a system (i.e. external MMS data).

Step S604: storing the MMS data in a first storage unit 10.

Step S606: writing the MMS data stored in the first storage unit 10 into a second storage unit 20 according to performance parameters of the second storage unit 20.

In this embodiment, by using the second storage unit 20 as a buffer, the traffic of data written into the second storage unit 20 is effectively controlled, consequentially, the MMS processing system is protected against an impact, and the stability and the performance of the system are improved.

Figure 7:
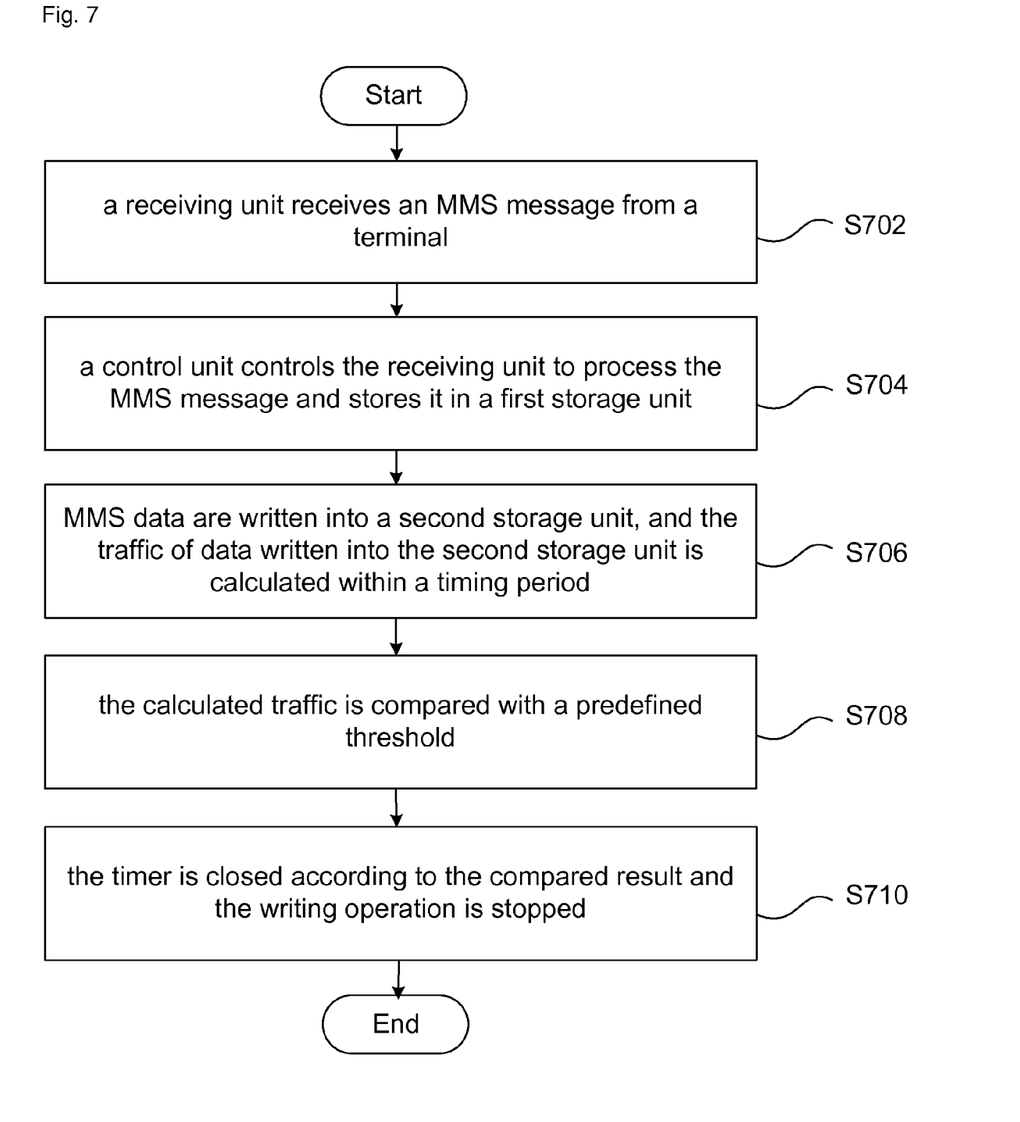
FIG. 7 is a flow diagram of a method for processing an MMS according to a preferred embodiment of the disclosure.

FIG. 7 is a flow diagram of a method for processing an MMS according to a preferred embodiment of the disclosure, as shown in FIG. 7, the method mainly comprises the following steps (steps S702-S710).

Step S702: a receiving unit 50 receives an MMS message from a terminal.

Step S704: a first control unit 30 controls the receiving unit 50 to process the MMS message into MMS data and stores the MMS data in a first storage unit 10, and the receiving unit 50 writes MMS data into the first storage unit 10 via an Mwrite interface and reads MMS data from the first storage unit 10 via an Mread interface.

Step S706: MMS data are written into a second storage unit 20, and a second control unit 40 calculates traffic of data written into the second storage unit 20 from the first storage unit 10 within a timing period of a timer.

Figure 9:
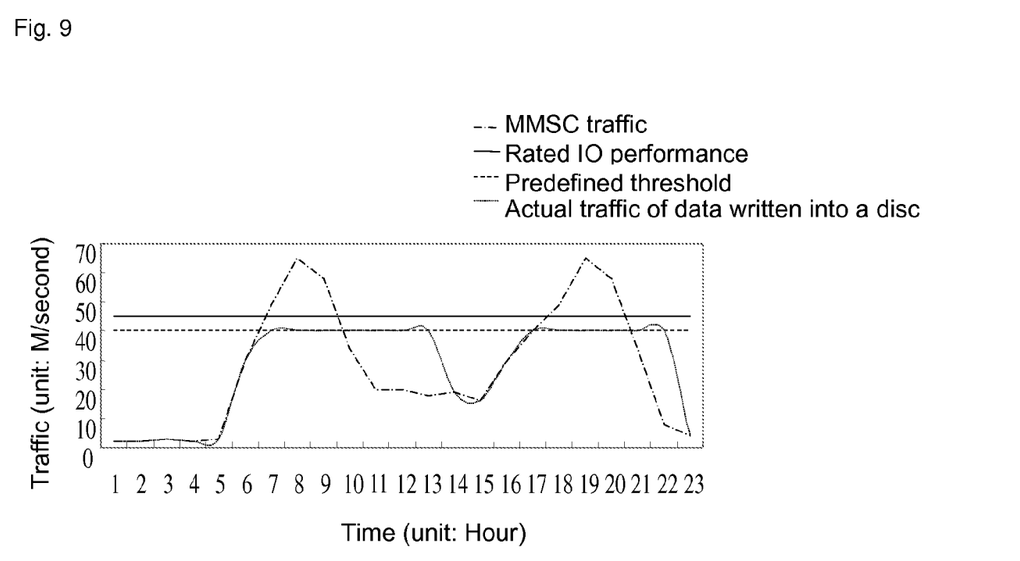
FIG. 9 is a schematic diagram illustrating the variation of the traffic of an MMSC with time according to a preferred embodiment of the disclosure.

Step S708: a comparator 406 compares the calculated traffic with a predefined threshold, wherein the predefined threshold is set according to the performance of the second storage unit 20 and should be less than the maximum rated 10 reading-writing performance of the second storage unit 20, as shown in FIG. 9, the predefined threshold is slightly less than a rated IO performance.

Step S710: a controller 408 controls the timer 402 according to the compared result and determines whether to write the MMS data stored in the first storage unit 10 into the second storage unit 20, and then the process returns to step S706. For instance, the MMS data stored in the first storage unit 10 is written into the second storage unit 20 if the result compared by the comparator is that the traffic of the traffic controller 404 is less than the predefined threshold; and the timer is closed and the writing operation is stopped if the traffic of the traffic controller is greater than or equal to the predefined threshold.

In a specific implementation, a memory storage system, which is called a memory for short, is used as a buffer. The direct storage of MMS data into a physical disc is improved as follows: MMS data are first stored in a memory and then stored in a physical disc. That is, the operation of an MMS processor writing into and reading from a physical disc in related technologies is modified to an operation of writing into and reading from a memory. In order to guarantee the sustained storage of MMS data in the memory before the MMS data are forwarded, it is necessary to store a backup of the MMS data in the physical disc so as to avoid a file loss or file overwrite in the case where the memory is powered off.

When the MMS data in the memory is transferred to and stored in a physical disc, considering that the IO performance of the physical disc, that is, the traffic transferred to the physical disc per second, is limited, the quantity of the MMS data should be less than the maximum reading-writing traffic per second of the physical disc; the memory transfers and stores the MMS data into the physical disc for an IO operation, which smoothes the traffic impact on an MMSC system; additionally, as the MMS data writing and reading of a service processor is separated from the IO operation of the physical disc, the stability and the performance of the MMSC system are improved.

Figure 8:
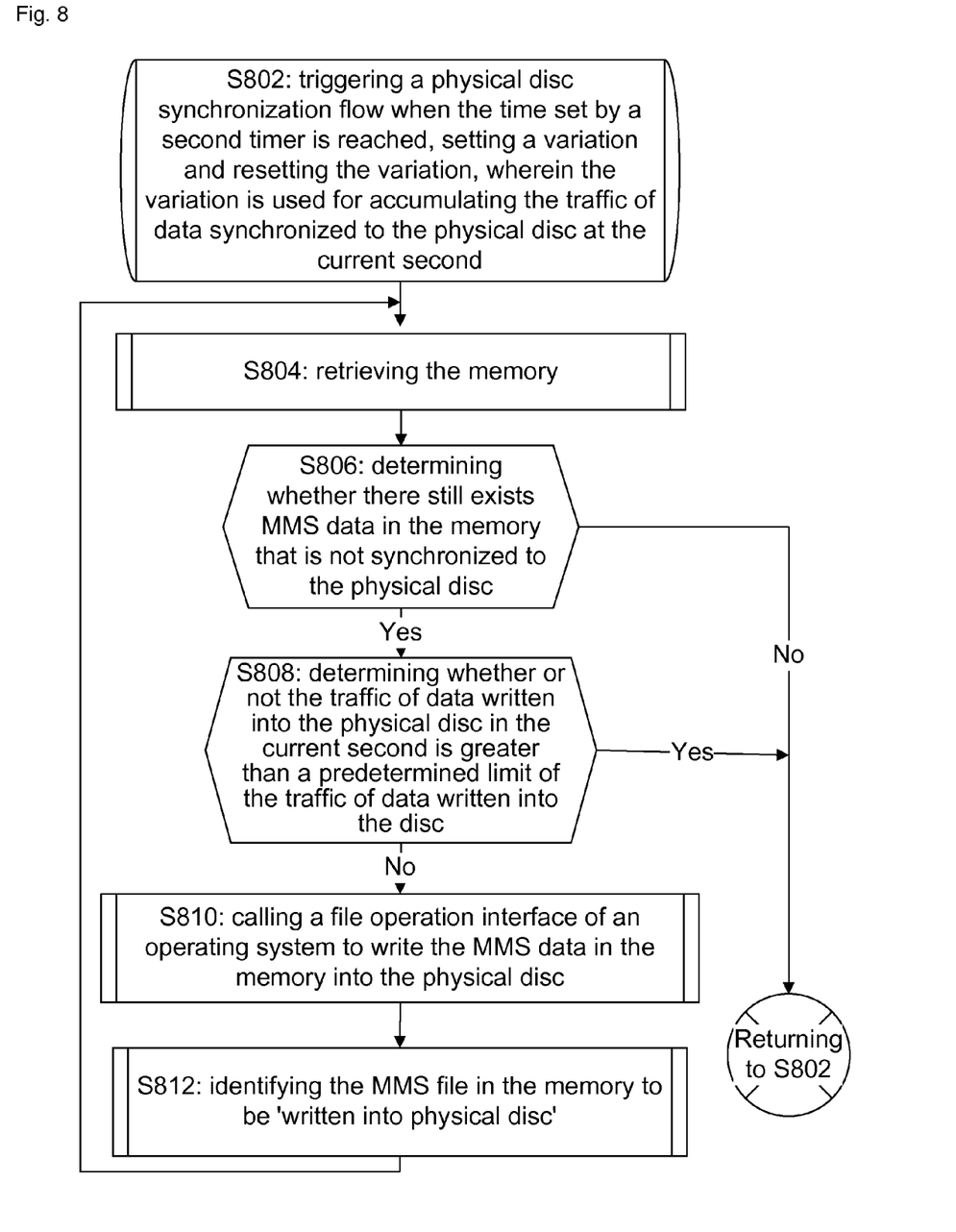
FIG. 8 is a flow diagram of a method for processing an MMS according to another preferred embodiment of the disclosure.

FIG. 8 is a flow diagram of a method for processing an MMS according to another preferred embodiment of the disclosure, as shown in FIG. 8, in this preferred embodiment, whether to trigger this flow is determined based on whether MMS data in a memory are being written into a physical disc, and the flow mainly comprises the following steps (steps S802-S812).

Step S802: triggering a memory to write MMS data into a physical disc at each time point recorded by a timer according to the writing condition of the MMS data, setting a variation and resetting the variation, wherein the variation is used for accumulating traffic of data written into the physical disc in a time interval; preferably, in this embodiment, the timer is a second timer, and the time interval is 1 second.

Step S804: retrieving the memory.

Step S806: determining whether there still exists MMS data in the memory that is not written into the physical disc; if yes, returning to step S802; otherwise, turning to step S808.

Step S808: comparing traffic of data written into the physical disc at the current second with a predefined limit of the traffic of data written into the disc; if the traffic of data written into the physical disc is greater than or equal to the traffic limit, returning to step S802 and waiting for triggering by the timer at a next second; otherwise, turning to step S810.

Step S810: calling an operation interface to write MMS data in the memory into the physical disc, and synchronously accumulating the MMS data to the traffic of data written into the physical disc in the current second.

Step S812: identifying the MMS data in the memory to be 'synchronized to physical disc', and then returning to step S804.

This embodiment provides a method for processing an MMS, which improves the processing performance of an MMSC, reduces the construction cost of an MMS server of the MMSC and guarantees the stable running of the MMSC by writing MMS data stored in the first storage unit into the second storage unit according to performance parameters of the second storage unit.

FIG. 9 is a schematic diagram illustrating the variation of the traffic of an MMSC with time according to a preferred embodiment of the disclosure, as shown in FIG. 9, traffic (e.g. mobile morning paper and mobile evening paper) of an MMSC is extremely large in the morning and evening, leading to a strong impact on the MMSC. However, due to the use of the method of this embodiment, the actual traffic of data written into a disc is not beyond a predefined threshold, therefore, the MMSC system can run stably, and consequentially, the possible problem is solved that the system performance is degraded or becomes unstable when the processing performance of the MMSC system exceeds an IO performance, and stable running of the MMSC system is guaranteed while the cost of the MMSC system is lowered.

In conclusion, by adopting a scheme in which an MMS data reading/writing operation is separated from a physical disc IO operation in an MMS server and the writing of a physical storage device is rated and delayed, the aforementioned embodiments of the disclosure solve the problem that due to the limitation in the IO performance of an storage unit of an MMSC system, the processing performance of the MMSC is degraded when the MMSC suffers a pulse-type impact, thereby reducing the requirements on the IO performance of an storage device in the MMSC system, avoiding the use of storage devices of high configuration, and lowering the cost on an MMSC system.

Apparently, it should be understood by those skilled in this art that the modules or steps of the invention can be realized by a universal computer, centralized on a single computer or distributed on a network consisting of multiple computers, and optionally realized by computer-executable program codes; the modules or steps can be therefore stored in a storage device to be executed by a computer or separately manufactured into integrated circuit modules, or some of the modules or steps are manufactured into a single integrated circuit module. Thus, the invention is not limited to any special combination of hardware and software.

The mentioned above is only preferred embodiments of the invention but not limitation on the invention; to those skilled in this art, various modifications and variations can be devised to this invention, and it should be understood that any modification, equivalent substitute and improvement devised without departing from the spirit and scope of the invention belong to the protection scope of the invention.

What is claimed is:

1. A system for processing a Multimedia Messaging Service (MMS), comprising:
   a first and second storage units for storing MMS data;
   a first control unit for controlling the storage of received MMS data outside the system into the first storage unit and data acquisition from the first storage unit; and
   a second control unit for controlling the writing of the MMS data stored in the first storage unit into the second storage unit according to performance of the second storage unit;
   wherein the second control unit comprises:
   a timer for synchronizing the MMS data in the first storage unit to the second storage unit at a fixed time;
   a traffic controller for calculating traffic of data written into the second storage unit from the first storage unit within each timing period of the timer;
   a comparator for comparing the traffic calculated by the traffic controller with a predefined threshold, wherein the predefined threshold is set according to the performance of the second storage unit; and
   a controller for determining whether to write the MMS data stored in the first storage unit into the second storage unit according to the result compared by the comparator.

2. The system according to claim 1, wherein the controller is further used for writing the MMS data stored in the first storage unit into the second storage unit if the traffic is less than the predefined threshold, and closing the timer and stopping the writing operation if the traffic is greater than or equal to the predefined threshold.

3. The system according to claim 2, further comprising:
   a receiving unit for receiving MMS data outside the system; and
   a sending unit for reading the MMS data from the first storage unit and sending the MMS data to the outside of the system.

4. The system according to claim 2, wherein the first storage unit comprises a memory, and the second storage unit comprises a physical disc.

5. The system according to claim 1, wherein the performance comprises reading-writing performance of the second storage unit.

6. The system according to claim 5, further comprising:
a receiving unit for receiving MMS data outside the system; and
a sending unit for reading the MMS data from the first storage unit and sending the MMS data to the outside of the system.

7. The system according to claim 5, wherein the first storage unit comprises a memory, and the second storage unit comprises a physical disc.

8. The system according to claim 1, further comprising:
a receiving unit for receiving MMS data outside the system; and
a sending unit for reading the MMS data from the first storage unit and sending the MMS data to the outside of the system.

9. The system according to claim 1, wherein the first storage unit comprises a memory, and the second storage unit comprises a physical disc.

10. A method for processing a Multimedia Messaging Service (MMS), comprising:
receiving MMS data outside a system;
storing the MMS data in a first storage unit; and
writing the MMS data stored in the first storage unit into a second storage unit according to performance parameters of the second storage units;
wherein the step of writing the MMS data stored in the first storage unit into a second storage unit according to performance parameters of the second storage unit comprises:
periodically calculating traffic of data written into the second storage unit from the first storage unit;
comparing the calculated traffic with a predefined threshold, wherein the predefined threshold is set according to the performance of the second storage unit;
writing the MMS data stored in the first storage unit into the second storage unit if the traffic is less than the predefined threshold; and
closing a timer and stopping the writing operation if the traffic is greater than or equal to the predefined threshold.

11. The method according to claim 10, further comprising: reading the MMS data from the first storage unit and sending the MMS data to the outside of the system.

12. The method according to claim 10, wherein the performance parameters comprise a reading-writing performance parameter of the second storage unit.

13. The method according to claim 10, wherein the predefined threshold is less than the maximum rated reading-writing performance of the second storage unit.

* * * * *